United States Patent [19]

Monkelbaan et al.

[11] Patent Number: 5,223,183

[45] Date of Patent: Jun. 29, 1993

[54] BAFFLED DOWNCOMER FRACTIONATION TRAY

[75] Inventors: Daniel R. Monkelbaan, Amherst; Michael R. Resetarits, Depew; Robert J. Miller, Niagara Falls, all of N.Y.

[73] Assignee: UOP, Des Plaines, Ill.

[21] Appl. No.: 862,472

[22] Filed: Apr. 2, 1992

[51] Int. Cl.$^5$ .............................................. B01F 3/04
[52] U.S. Cl. ................................................. 261/114.1
[58] Field of Search ..................................... 261/114.1

[56] References Cited

U.S. PATENT DOCUMENTS

| | | | |
|---|---|---|---|
| 3,410,540 | 11/1968 | Bruckert | 261/113 |
| 3,417,975 | 12/1968 | Williams et al. | 261/114.1 |
| 3,434,701 | 3/1969 | Bauer | 261/114.1 |
| 3,658,306 | 4/1972 | Jones | 261/114.1 |
| 4,159,291 | 6/1979 | Bruckert | 261/114.1 |
| 4,499,035 | 2/1985 | Kirkpatrick et al. | 261/114 JP |
| 4,550,000 | 10/1985 | Bentham | 261/114.1 |
| 4,582.569 | 4/1986 | Jenkins | 202/158 |
| 5,098,615 | 3/1992 | Resetarits | 261/114.1 |

OTHER PUBLICATIONS

"Distillation with less energy," Chemical Week, Oct. 19, 1983, p. 30.

Primary Examiner—Tim Miles
Attorney, Agent, or Firm—Thomas K. McBride; John F. Spears, Jr.

[57] ABSTRACT

The efficiency of multiple downcomer type fractionation trays is increased by increasing the length of the liquid flow path and providing Lewis Case II point to plate efficiency enhancement Baffles (7) extending axially along the vertical axis of a fractionation column divide the intertray volumes of the column into defined vapor passageways. A pair of inclined liquid deflecting baffles (3) over each downcomer (10) connects the outlets and inlets of vertically adjacent downcomers and provides a crisscrossing liquid flow path.

12 Claims, 4 Drawing Sheets

BAFFLED DOWNCOMER FRACTIONATION TRAY

FIELD OF THE INVENTION

The invention relates to the design and construction of vapor-liquid contacting apparatus. The invention therefore relates to, for example, apparatus used as fractionation trays within fractional distillation columns to perform separations of volatile chemical compounds. The invention may be used in a variety of other gas-liquid contacting operations such as acid gas scrubbing or absorption processes

PRIOR ART

Fractional distillation trays are widely employed in the hydrocarbon processing, chemical, and petrochemical industries. Accordingly, a large amount of research, development, and creative thinking has been devoted to providing improved fractional distillation trays. Fractionation tray development has therefore provided many variations in contacting area structure, downcomer design, and overall tray structure U.S. Pat. No. 3,410,540 issued to W. Bruckert is believed pertinent for its showing of the structure of a prior art multiple downcomer type tray employing the highly distinctive downcomer design similar to that employed in the subject tray.

U.S. Pat. No. 4,582,569 issued to A. E. O. Jenkins is believed pertinent for its showing of a fractionation column wherein the upward vapor flow is divided into two separate parallel streams by a central baffle extending through the center of the column An article appearing at page 30 of the Oct. 19, 1983 edition of *Chemical Week* magazine illustrates another fractionation tray flow wherein a central baffle divides the column into two separate vapor passage zones, with the liquid flowing downward from side to side between the two zones.

The use of vapor-directing slots in the tray surface to promote the movement of liquid is described in U.S. Pat. No. 4,499,035 issued to R. D. Kirkpatrick et al.

BRIEF SUMMARY OF THE INVENTION

The invention is an improved vapor-liquid contacting apparatus for use in fractional distillation. The subject invention employs the type and arrangement of downcomers used in multiple downcomer-type trays, as opposed to the more widely used cross-flow trays, together with a unique system of vapor and liquid flow directing baffles to provide a high capacity and high efficiency contacting device. A preferred embodiment of the subject invention is also characterized by providing parallel liquid flow across the tray and by dividing the upward vapor flow into multiple separate streams The various embodiments of the invention share the common features of having the downcomers in parallel alignment above one another and having sloped downcomer baffles covering the inlets of the downcomers. The alignment of the sloped downcomer baffles may be varied to provide different liquid flow paths and thus different embodiments of the invention. In a preferred embodiment, central liquid/vapor baffles extend upward from the tray surface to direct liquid and froth flow across the tray surface and to prevent admixture of liquid and froth intended to be moving in different directions.

The trays may employ one or more downcomers. One embodiment of the invention, which employs trays having a single downcomer, may be characterized as a trayed fractionation column useful in the separation of volatile chemical compounds and comprising a cylindrical outer vessel having an enclosed upper first end and an enclosed lower second end, and a cylindrical internal volume; a plurality of multiple downcomer-type vapor-liquid contacting trays spaced vertically apart along the central axis of the outer vessel, each tray having a generally circular circumference and comprising (i) at least one centrally located, narrow, trough-shaped downcomer, each downcomer being formed by two opposing side walls and two end walls which are shorter than the side walls, the side walls and end walls being oriented perpendicular to the plane of the tray, each downcomer having an open inlet and a liquid sealable outlet means, with the downcomer means of vertically adjacent trays being in vertical alignment above one another, (ii) at least two elongated vapor-liquid contacting decks, with a vapor-liquid contacting deck being located adjacent each downcomer side wall such that the tray has at least one more vapor-liquid contacting deck than downcomer means; a centrally located planar liquid/vapor baffle located on each tray and bisecting the length of each downcomer into two halves along the central axis of the outer vessel and dividing each vapor-liquid contacting deck into two symmetrical areas each having a shape of a 90 degree sector; the liquid/vapor baffle extending perpendicular from the deck surface to a point above the downcomer inlet; and, means to define vertical liquid flow paths between adjacent trays comprising a plurality of inclined downcomer baffles, with each baffle extending from one sidewall of each downcomer to an opposite sidewall of an aligned downcomer of a vertically adjacent tray, the downcomer baffles crossing over the open inlets of the downcomers, with each of two downcomer baffles being placed over different sections of each downcomer and with the two downcomer baffles of each downcomer being inclined to deliver liquid to different contacting decks

DESCRIPTION OF PREFERRED EMBODIMENTS

Figure 1:
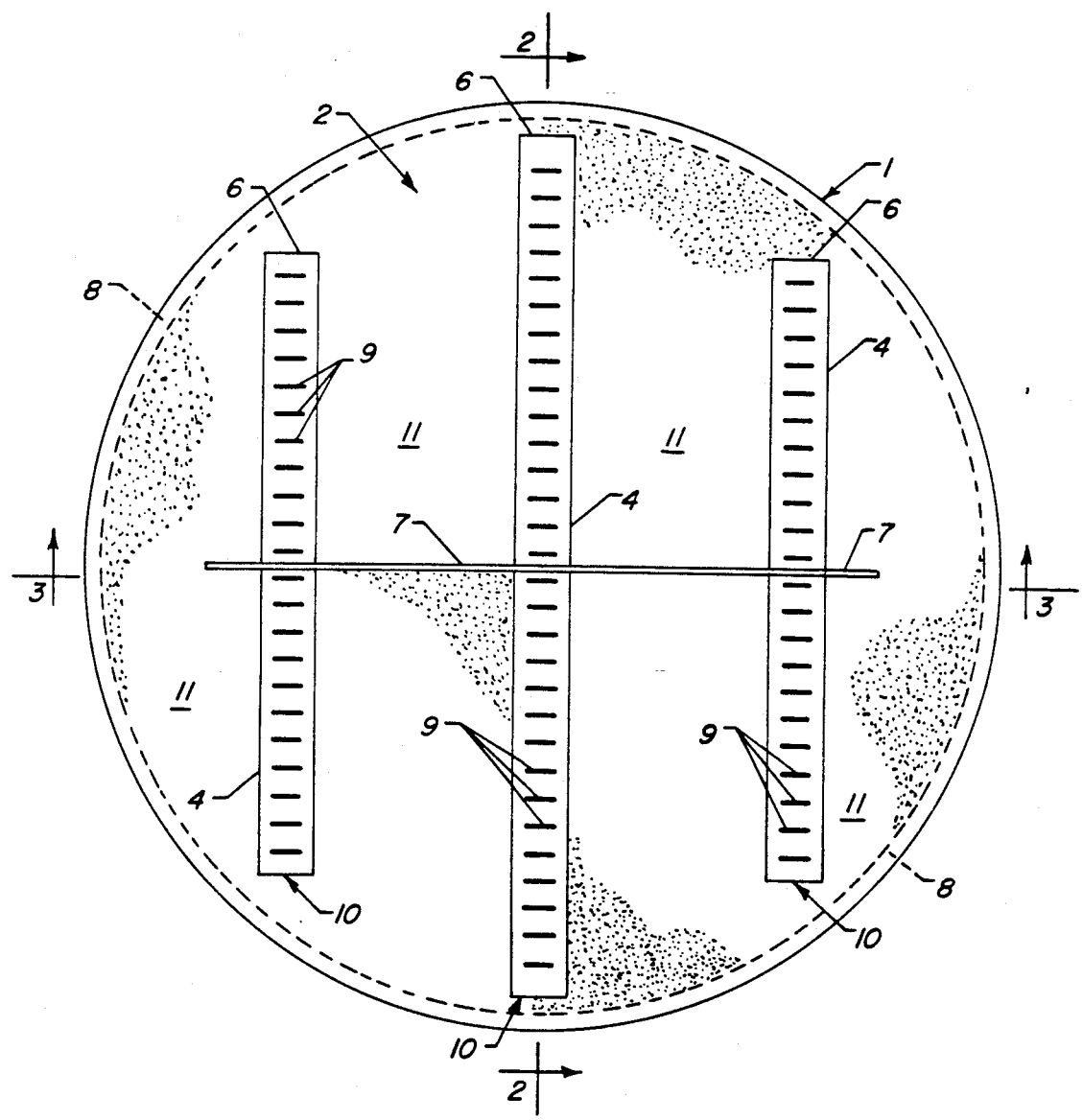
FIG. 1 is a sectional view looking downward into a fractionation column showing the three downcomers 10 spaced across the tray, with the central liquid/vapor baffle 7 dividing the internal volume of the column into two separate passageways The view shows a uniform distribution of the liquid outlets 9 along the length of the downcomers 10.

Vapor-liquid contacting devices are used in a wide variety of applications for bringing into contact a liquid, which flows in a generally downward direction in the overall device, with a rising vapor stream. For instance, these devices are widely used to contact a gas stream with a treating liquid which selectively removes a product compound or an impurity from the gas stream. The subject apparatus can therefore be used in an acid gas absorber or stripper or in an ethylene oxide absorber Another application of vapor-liquid contacting apparatus is in the separation of chemical compounds via fractional distillation. The apparatus of the subject invention can therefore be used in a variety of vapor-liquid contacting roles. The discussion herein is primarily in terms of use in a process for separation by fractional distillation, but this is not intended to in any way restrict the use of the invention to that mode of operation.

The subject apparatus can be used in the separation of essentially any chemical compound amenable to separation or purification by fractional distillation. Fractionation trays are widely used in the separation of specific hydrocarbons such as propane and propylene or benzene and toluene or in the separation of various hydrocarbon fractions such as LPG (liquified petroleum gas), naphtha or kerosene. The chemical compounds separated with the subject apparatus are not limited to hydrocarbons but may include any compound having sufficient volatility and temperature stability to be separated by fractional distillation. Examples of these materials are acetic acid, water, acetone, acetylene, styrene acrylonitrile, butadiene, cresol, xylene, chlorobenzenes, ethylene, ethane, propane, propylene, xylenols, vinyl acetate, phenol, iso and normal butane, butylenes, pentanes, heptanes, hexanes, halogenated hydrocarbons, aldehydes, ethers such as MTBE and TAME, and alcohols including tertiary butyl alcohol and isopropyl alcohol.

Two determinants of the quality of a contacting tray are its efficiency for performing a separation and its capacity in terms of liquid or vapor traffic. It is an objective of the subject invention to increase the efficiency of multiple-downcomer trays It is another objective of the invention to provide a vapor-liquid contacting apparatus having a Lewis Case 2 vapor-liquid contacting arrangement Before proceeding further with a description of the invention, it is useful to define and characterize the type of tray referred to herein as a "multiple downcomer-type"tray. This term is used herein to distinguish the subject invention from other types of fractionation trays.

A multiple downcomer tray is distinguished from the conventional crossflow tray by several structural characteristics. First, a multiple downcomer tray does not have a "receiving pan". This is the normally imperforated section located below an inlet downcomer opening. Reference is made to previously cited U.S. Pat. No. 4,582,569 to A. E. O. Jenkins which illustrates a receiving pan 8 in FIG. 1. A receiving pan is the imperforate area upon which the liquid descending through the downcomer impacts before passing onto the decking of the tray. Often the receiving pan is separated from the decking or "active" area of the tray by an inlet weir. Receiving pans are therefore normally located directly below the downcomer leading from the next above conventional fractionation tray.

The horizontal surface area of a multiple downcomer fractionation tray is basically divided into downcomer means and vapor-liquid contacting area normally referred to as decking. There are no imperforate areas allocated to receiving descending liquid from the tray located immediately above Another distinguishing feature of multiple downcomer type fractionation trays is the provision of a relatively large number of trough-like downcomer means across the tray The subject trays can employ from one to seven or more downcomers. These downcomer means are spaced relatively close together compared to the customary crossflow fractionation trays as they are spread across the surface of the tray rather than being at the periphery of the tray. The distance between adjacent downcomers (measured between their sidewalls or weirs) of the same tray is normally between 0.3 and 1.0 meters and will often be less than 0.5 meter. This results in a multiple downcomer type tray having a unique design when viewed from above consisting of the alternating decking areas and downcomer means evenly spaced across the upper surface of the fractionation tray, as for instance shown in FIG. 1.

The actual downcomer means of a multiple downcomer tray are also unique compared to the downcomers employed upon normal cross-flow fractionation trays. The downcomer means do not extend downward to the next fractionation tray. Rather they stop at an intermediate distance located between the two trays. The downcomer descending from the tray above therefore stops well above the deck surface and the inlet to the downcomers of the tray below. The top or inlet to the downcomer of a multiple downcomer tray functions as the outlet weir of the tray, and the bottom of the downcomer of a multiple downcomer tray above is therefore well above the outlet weir of the tray located below.

When installed in a fractionation column, the downcomers on prior art multiple downcomer trays are oriented at 90 degrees from the trays located immediately above and below. The downcomers of each tray in the subject invention are, however, aligned with the downcomers on the other trays of the column such that the downcomers on one tray are immediately below those on the tray above. The outlets of one downcomer are directly above the inlet of another The downcomers are arranged along a number of planes which extend along the central vertical axis of the column. The number of planes is equal to the number of downcomers on a tray.

Yet another distinguishing feature of multiple downcomer type fractionation trays is the provision of a liquid sealable means in the bottom or outlet of the downcomer means. The bottom of the downcomer means is therefore partially closed off by a plate having various perforations or by some other means intended to retard the direct downward flow of liquid out of the downcomer means. This liquid sealable outlet is located well above the deck of the tray located immediately below and is at a level above the inlet of the downcomers associated with this next lower tray. The descending liquid is collected in the lower portion of the downcomer means and spills forth upon the next lower tray through these openings.

There is no inlet weir at the bottom of the downcomer of the subject multiple downcomer type trays as in a cross-flow tray. The liquid sealable outlet performs this function and, again, the bottom of the downcomer is well above the next tray.

Conventional multiple downcomer trays are characterized by a very short liquid flow path between the point at which the liquid first falls on the tray and the point at which the liquid exits the tray via the downcomer means. This is due primarily to the close spacing of the downcomers as described above. This short distance the liquid must travel coupled with the agitation attendant with the passage of vapor upward through the decking results in multiple downcomer trays having essentially no liquid level gradient from the liquid inlet to exit points.

With the distance between downcomer side walls of adjacent downcomers (the width of a decking section) being between 1 and 0.3 meters, the average liquid flow path is less than one meter.

The physical size of any portion of a multiple downcomer tray must be chosen by a skilled designer considering all aspects of the intended operation of the tray. The following are measurement ranges of commercially employed conventional multiple downcomer type trays which are presented for the dual purposes of providing guidance in the design and use of the subject apparatus and for distinguishing the multiple downcomer type trays of the subject invention from conventional crossflow fractionation trays. The spacing between vertically adjacent trays will normally be between 20 and 91 centimeters (8-36 inches) and is preferably between 25-61 centimeters (10-24 inches). The total open area of the deck area is generally in the range of about 5 to about 15 percent. This includes the open area provided by both circular openings and any elongated slots present in the decking area of the tray. The normal hole diameter of the circular perforations may range from about 0.3 to about 2.6 centimeters ($\frac{1}{8}$-1.0 inches). A hole size of about 0.47 to about 0.64 centimeters (3/16-$\frac{1}{4}$ inch) is normally preferred. The open area provided by slots is preferably from about 0.25 to about 5 percent of the area of the deck. A representative thickness of the decking is about 0.19 centimeters (0.075 inches) to 0.34 cm.

The rectangular inlet openings of the downcomers of a multiple downcomer type tray are normally about 6 to about 25 cm wide (2.5-10 inches). The height of a downcomer as measured from the horizontal top edge of the sidewall to the bottom edge of the sidewall is normally between about 15.2 to about 45.7 centimeters (6-18 inches). This includes the height that the downcomer extends above the decking and below the decking. The central liquid/vapor baffle will normally be approximately equal in height to the associated downcomer means sidewall. The height of the liquid flow directing baffles (13) may range from about 10 to about 30 centimeters as measured from the tray decking to the horizontal upper surface of the baffle. Further information on the arrangement and variations of the elements of a multiple downcomer tray may be obtained by reference to U.S. Pat. No. 3,410,540 which is incorporated herein by reference.

The subject invention aims to provide a high tray efficiency by (1) achieving the benefits of a Lewis Case flow and/or (2) providing longer average liquid flow path across the tray deck.

The advantages of parallel flow on fractionation trays was set out in a well-known classic study by W. K. Lewis in 1936. In the three vapor-liquid contacting scenarios investigated in this study, Case 2 was defined as an unmixed vapor proceeding up the column as liquid flows across each successive tray in the same direction while Case 3 was defined as unmixed vapor proceeding up the column as liquid flows across each successive tray in alternate directions. Case 2 is referred to as a parallel flow. Case 3 is a conventional flow path. Lewis' Case 2 ensures that the driving force for mass transfer on a given tray is nearly the same regardless of where that mass transfer occurs on the tray. Because of this, substantial increases in efficiency can be obtained when using a tray operated according to Lewis' Case 2. It is therefore an objective of the invention to provide a multiple downcomer type tray providing a Lewis Case 2 parallel flow pattern.

It must be noted that as used herein the term "parallel flow" refers to liquid flows on vertical adjacent or successive trays rather than to two liquid flows on a single tray.

As mentioned above, conventional multiple downcomer trays have a short liquid flow path. Providing a longer liquid flow path will increase the efficiency of a multiple downcomer type tray. Therefore in one embodiment of the invention (see FIGS. 5 & 6) a longer flow path is provided. This embodiment achieves the longer flow path while still maintaining parallel flow by changing the orientation or direction of slope of some of the downcomer baffles covering the downcomer inlets.

The two fundamental structural characteristics of the subject tray are that it is a multiple downcomer type tray with the downcomers aligned above one another, as set out above, and that at least two alternately sloped downcomer baffles extend upward from one sidewall of each downcomer and cover the downcomer inlet. The downcomer baffles prevent liquid from the tray above from entering each downcomer and define the direction of liquid flow onto the tray deck.

An embodiment of the invention incorporating these two fundamental features may be characterized as: a vapor-liquid contacting tray having a generally circular circumference and comprising: (i) at least one centrally located, narrow, trough-shaped downcomer, each downcomer being formed by two opposing side walls and two end walls which are shorter than the side walls, the side walls and end walls being oriented perpendicular to the plane of the tray, each downcomer having an open inlet and a liquid sealable outlet means, (ii) at least two elongated vapor-liquid contacting decks, with a vapor-liquid contacting deck being located adjacent each downcomer side wall such that the tray has at least one more vapor-liquid contacting deck than downcomer means; and, (iii) means to define vertical liquid flow paths for liquid flowing onto the tray from a vertically superior downcomer comprising two inclined downcomer baffles, with the downcomer baffles intersecting an upper edge of the side walls and preferably being separated from each other by a substantially imperforate seal plate, the downcomer baffles being substantially equal in length to one-half of the associated downcomer and crossing over the open inlets of each downcomer, with the two downcomer baffles of each downcomer being inclined to deliver liquid to different contacting decks.

The vertical alignment of the downcomers aids in defining discrete vapor flow paths within the column. The definition of the separate flow paths is completed by the sloped downcomer baffles. Gaps are preferably allowed at the end of the downcomers to allow for pressure equalization and to provide uniform vapor flow across the tray surface. This is a practical concession to a desire to maintain true confined gas flows in the column.

The parallel liquid flow across the tray is maintained by this series of imperforate downcomer baffles extending from the upper edge of one sidewall of each downcomer to the bottom edge of the opposing sidewall of the next higher downcomer. This baffle system intercepts liquid descending from the upper downcomer and prevents it from entering the outlet of the next lower downcomer. This eliminates any possibility of liquid bypassing the next lower tray by entering that tray's downcomer. The inclined surface of the baffle also is beneficial in that it imparts a horizontal momentum to the descending liquid which tends to push the liquid and froth present on the tray towards the inlet of the outlet downcomer for this portion or zone of the tray.

Liquid flow paths on the tray will vary with such factors as the number of downcomers present on the tray and on which zone of the tray the liquid is flowing If there are two or more downcomers, some liquid will flow onto deck areas between two downcomers and will then flow either perpendicular or parallel to them. In contrast, liquid descending onto a tray deck from the outermost downcomer, or on a single downcomer tray, flows toward the outer wall of the column. The inner surface of the column, preferably together with directional tray slotting, then directs the liquid around the central baffle to the other vapor passageway of the column. This is a semi-circular flowpath defined by the vessel wall and the vertical central baffle similar in nature to a "horse shoe tray".

Some embodiments of the subject invention include additional imperforate vertical baffles attached to the tray surface at downcomer midpoints and extending upward into the intertray volume between trays to divide it into multiple vapor passageways. .These vertical baffles prevent liquid and froth flowing in opposite directions on the two sides of the trays from admixing. The baffles thereby prevent liquid from "short cutting" across decking and avoiding its intended path.

It is preferred that the trays of the subject invention include a number of vapor-directing slots in the decking section of the fractionation trays. The slots are oriented such that the gas rising upward through the deck through these slots imparts a horizontal thrust or momentum to the liquid or froth on the tray in the direction of the nearest downcomer means. This is especially preferred at the end of each side of the trays where the liquid must flow in a semicircular pattern around the central baffle. These slots and their function may resemble those described in U.S. Pat. No. 4,499,035 which is incorporated herein by reference U.S. Pat. No. 3,417,975 issued to B. Williams et al. provides representations of a portion of decking material having both circular perforations and flow directing slots. This patent is also incorporated herein for its teaching as to the design and usage of flow directing slots.

The vapor rising upward through the slots leaves the slots at an angle to the tray surface having a definite horizontal component and imparts some of the horizontal momentum of the vapor to the liquid phase or suspended droplets above the deck surface. This results in a net force pushing the froth towards the outlet downcomer. There is therefore achieved a more rapid passage of the froth into the downcomer means and a decrease in the froth height on the tray. More importantly by proper slot arrangement there should be no zone on the tray having liquid which is not flowing toward an outlet.

A more complete understanding of the subject invention may be obtained by reference to the drawings. FIG. 1 shows the view seen looking downward toward the upper surface of a multiple downcomer tray 2 located within the circular outer wall 1 of the outer vessel. The particular tray represented in this drawing has three downcomers and the tray is supported by an angle-iron ring 8 which is welded to the inner surface of the wall. Each downcomer 10 is comprised of two downcomer end walls 6 and two parallel downcomer side walls 4. The downcomers are uniformly spaced across the tray. Located between the downcomers is the perforated decking or deck 11 portions of the tray. Perforated decking 11 is also present between the extrememost downcomer means and the outer periphery of the tray. That is, the portion of the tray enclosed between the end downcomers and the perimeter of tray is also filled with perforated decking and is an active vapor-liquid contacting area of the tray. There is no significantly sized imperforate area present in any of the decking portions of the tray to act as a liquid receiving pan.

The decks will preferably comprise both standard symmetrical (circular) perforations which are uniformly distributed across the decking surface and the above mentioned vapor-directing slots. The precise alignment or spacing of the circular perforations is not believed to be a controlling variable in the subject invention. It is important, however, that a higher number of perforations per unit area be provided on portions of the tray deck which receive liquid from more than one downcomer to maintain a uniform vapor to liquid flow ratio across the tray.

A representative maximum preferred spacing between any two flow-directing slots is on the order of from about 5 to 17.8 centimeters (2 to 7 inches). The perforations are preferably spread in a relatively uniform manner across the entire deck area. To minimize fabrication expense, the deck material is normally constructed by first perforating the deck material to provide the desired number of circular openings. A second perforation step is then performed to impart the flow-directing slots. No attempt is made to align the slot openings with or to have the slot openings fall between the circular perforations. Therefore, as shown in the cited patent, some of the slot openings will actually fall in the same location as the circular openings and the portion of the deck material which forms the slot may also have a perforation.

Referring again to FIG. 1, it may be observed that each of the rectangular trough-like downcomers is formed by two parallel side walls 4 joined to two parallel end walls 6. At the midpoint of each downcomer a central baffle 7 rises upward from each deck area of the overall tray surface. These baffles prevent liquid and froth present on the two sides of the baffle from admixing. The baffles terminate a short distance below the next higher tray to provide a small gap which allows pressure and vapor flow rate equalization. The two terminal baffles are separated from the inner surface of the vessel by a discrete distance to allow the flow of liquid from one side of the tray to the other. This distance should be greater than one-half the maximum distance from the downcomer side wall to the vessel wall. FIG. 1 shows the large number of dynamically sealable liquid outlets in the bottom of the downcomers. The arrangement of these outlets are different from conventional multiple downcomer-type trays in that they are uniformly spaced along the length of the downcomer.

Figure 2:
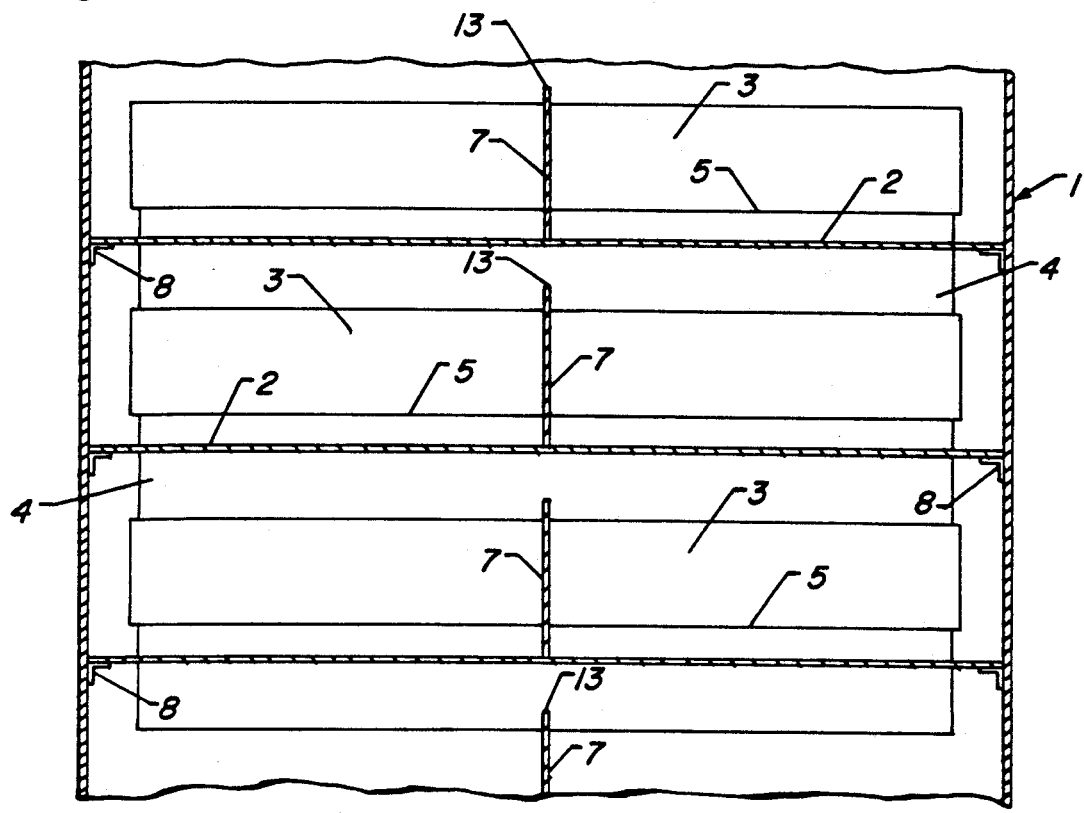
FIG. 2 is a sectional side view of the column 1 shown in FIG. 1 to show a better view of the structure of the downcomer side walls 4 of the downcomers and the connecting downcomer baffles 3.

FIG. 2 illustrates the view seen along the section line indicated on FIG. 1. This is equivalent to looking at the apparatus of FIG. 3 after it has been rotated 90 degrees. The principal features seen in this view are the large planar surfaces of the downcomer side walls 4 and the slanted downcomer baffles 3. It may be seen that the downcomer baffles extend between the downcomers in such a manner that neither liquid nor vapor may travel horizontally over the downcomers from one decking surface to another. The end view of the central baffles 7 shows their planar structure perpendicular to the downcomers. Each tray 2 is supported at the vessel wall by means of a support ring 8. Typically a lower piece of "angle" stock is welded to the downcomer wall to support the decking. A second piece of "angle" stock is bolted to the wall above the decking to form a groove which retains the tray.

The bottom of the downcomers is typically a flat bottom plate extending between the side walls 4. A number of relatively large openings or perforations are provided in the bottom plate for the purpose of allowing the rapid exit of the liquid which accumulates within the downcomer. The purpose of the bottoms plate is to retard the liquid flow sufficiently that the bottom of the downcomer means is dynamically sealed by liquid to the upward passage of vapor. In the subject trays the openings are distributed uniformly along the length of each end of a downcomer. The openings may be circular, square or elongated in either direction, that is, along the width or length of the downcomer means. Circular openings and elongated grooves extending between the side walls 4, sometimes referred to as louvres, are preferred. The sealing of the downcomer outlet to upward liquid flow could be accomplished by other structures and does not form part of the subject invention.

Figure 3:
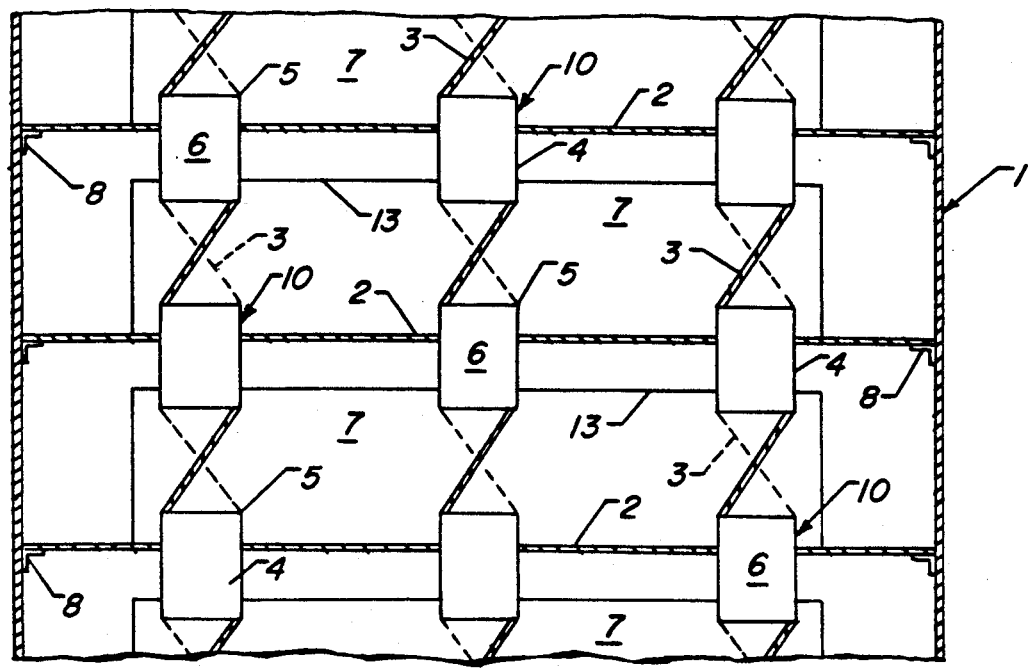
FIG. 3 is a sectional side view seen looking across the portion of column shown in FIG. 2 illustrating the three trays 2, each of which has three downcomers 10, with a downcomer baffle 3 preventing descending liquid from flowing into the next lower downcomer.

FIG. 3 is a sectional view looking in a horizontal direction through a portion of the fractionation column shown in FIG. 1. FIG. 3 shows the portion of each downcomer on one side of the central vapor baffles 7. Three multiple downcomer fractionation trays 2 in this portion of the column and the stacked vertical alignment of the three downcomers 10 of each tray are both visible in this view of apparatus. The gap between the bottom of the decking 11 of each tray and the top edge of the central baffles 7 is visible in this view. This view makes it easier to discern the manner in which the angular ring 8 supports the trays and the way in which the downcomer baffles 3 extend from the inlet of one downcomer to the outlet of the downcomer located just above it. In this embodiment two sloped downcomer baffles cover the inlet of each downcomer. The downcomers have "opposite" slopes which deliver liquid onto deck portions on different sides of the downcomer.

In this embodiment the baffles 3 on one side of the tray all slope in the same direction, and the baffles on the other side (or other half) of the column face in the opposite direction. Liquid therefore flows in the opposite direction on the two sides of any one tray, but flows in the same direction on all deck areas on one side of each tray. That is, in FIG. 3 the liquid would flow from right to left on the visible or front side of each of the three trays while it would flow from left to right on the side of the portion of the trays hidden behind the central baffle 7. This view also illustrates that the central baffles 7, or an equivalent imperforate structure extend over the inlet of the downcomer to provide a vertical wall which prevents liquid flow from one downcomer baffle to the other. The two descending liquid flows are therefore segregated. It may also be seen in this figure that at least about 1/5-¼ of the total height of the downcomer is located above tray decking to provide outlet weirs for the tray, with the remainder of the downcomer means extending below the decking. The vapor baffle 7 has an upper edge 13 which is located below and runs parallel to the bottom of the next higher tray.

Each of the downcomers is considered as extending across the entire tray. It is not broken into two separate downcomers by any plate or baffle extending downward into the downcomer or by any other means. The liquid within the downcomers is therefore free to move between the two sides of the tray and to intermix freely. The flow and intermixing of liquid within the downcomer is essential to ensure uniform liquid distribution across the tray. Liquid must be able to flow freely between the two sides of the downcomer. This ability to transfer liquid via the downcomers can be combined with a variation in the size of the liquid sealable outlets in the bottom of the downcomer to control the amount of liquid delivered to different portions of the tray deck. This is useful in maintaining a uniform vapor to liquid flow ratio across the deck. A number of braces preferably extend across the downcomer inlet for strength and to stabilize the liquid flow within the downcomer.

It is preferred that the sloped baffles 3 that connect the downcomers are substantially imperforate. However, if desired, small covered openings such as the flow directing slots can be provided as a means of allowing vapor passage and increased the vapor-liquid contacting area.

Figure 4:
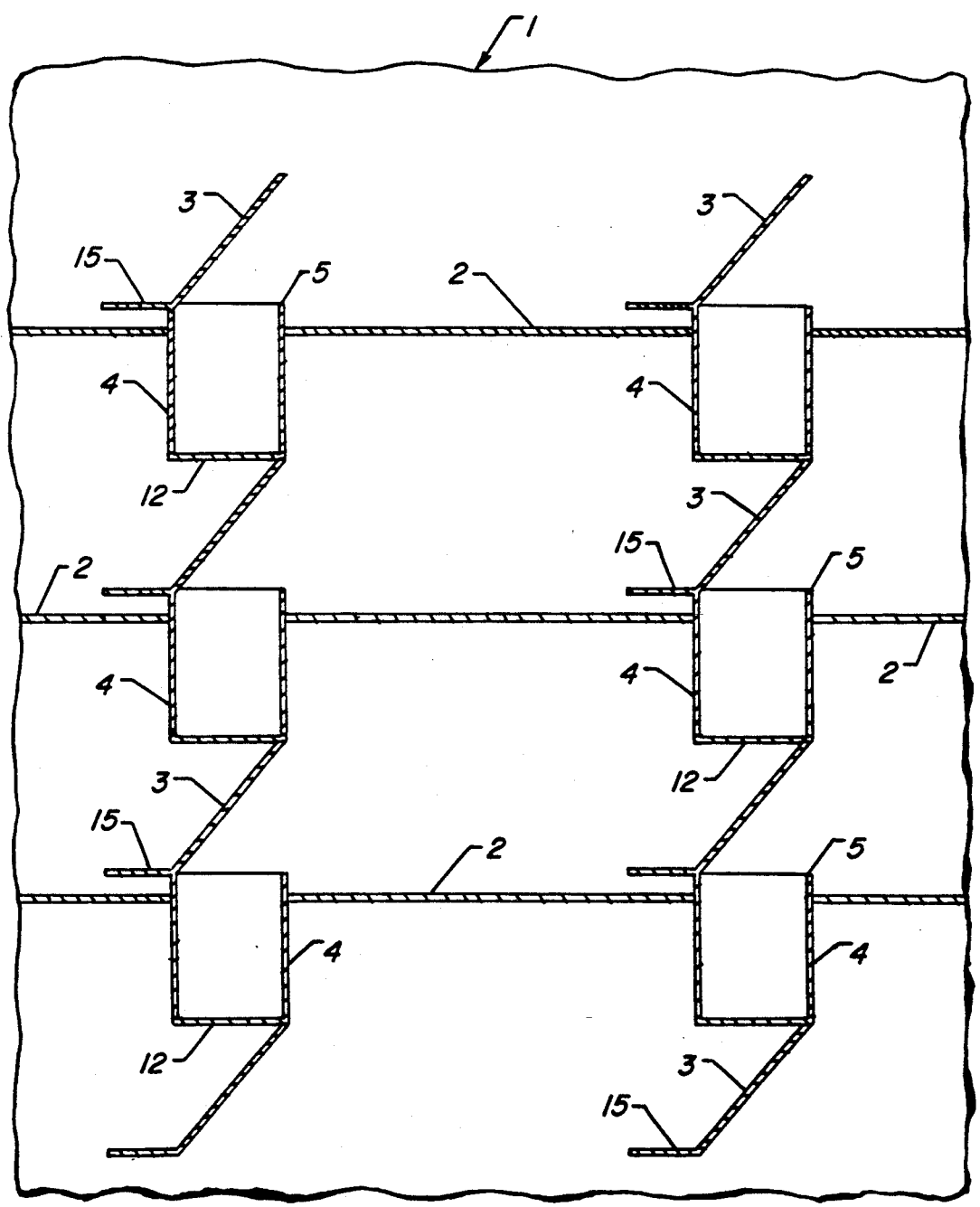
FIG. 4 is a simplified cross section looking lengthwise down two downcomers and showing the placement of a vapor-deflecting baffle 11 at the upper edge of downcomer sidewall 4.

FIG. 4 illustrates an optional feature which can be employed on the subject trays. This feature comprises a preferably imperforate substantially horizontal plate 11, referred to as a vapor deflecting baffle, fastened to the sidewall 4 of the downcomer or to the downcomer baffle 3. The preferred point of location is at the point at which the planar downcomer baffle 3 and the downcomer sidewall intersect to form a seal which restricts or prevents vapor and liquid flow. The vapor deflecting baffle can be a separate plate fastened to the downcomer at this point or it may be a lip formed by a simple extension of the downcomer baffle. The vapor deflecting baffle limits the upward flow of vapor toward the outlet of the downcomer and ensures liquid is flowing horizontally when it impacts upon the tray deck. This baffle is also intended to utilize the trapped vapor flow to impart horizontal momentum to the liquid entering the tray.

Figure 5:
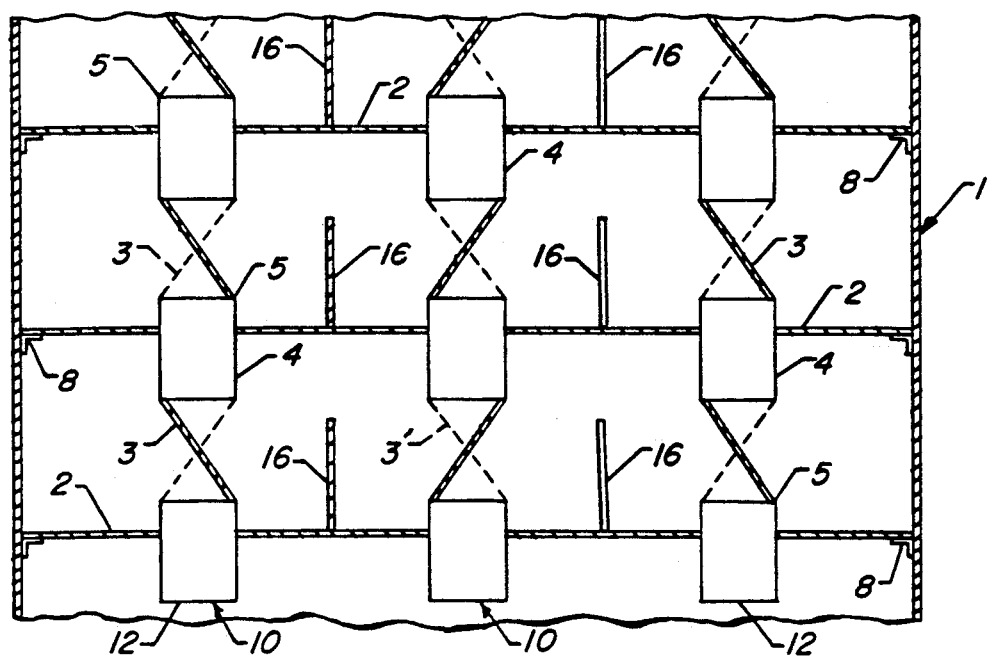
FIG. 5 is a sectional side view illustrating a different embodiment of the invention characterized by liquid being directed onto the same portion of tray 2 by the sloped downcomer baffles 3 and 3' of two different downcomers.

FIG. 5 shows a different overall tray arrangement. This tray design is highly similar to that shown in FIGS. 1-3. However, the downcomer baffles 3 are not all aligned in the same direction on each tray as they are in FIG. 3. In this specific three downcomer tray system, the middle downcomer battle 3' is oriented at an opposite incline to the other two downcomers baffles 3. The downcomer baffle on the "front" of the middle downcomer has the same slope as the downcomer baffles on the "back end" of the two adjacent downcomers. This downcomer baffle arrangement is uniform on each tray of column.

When, as shown in FIG. 5, two downcomer baffles direct liquid to the same portion of tray deck the design of that portion of the deck and of the downcomer outlets must be chosen to provide the same ratio of vapor to liquid flow rates as on other portions of the tray.

Figure 6:
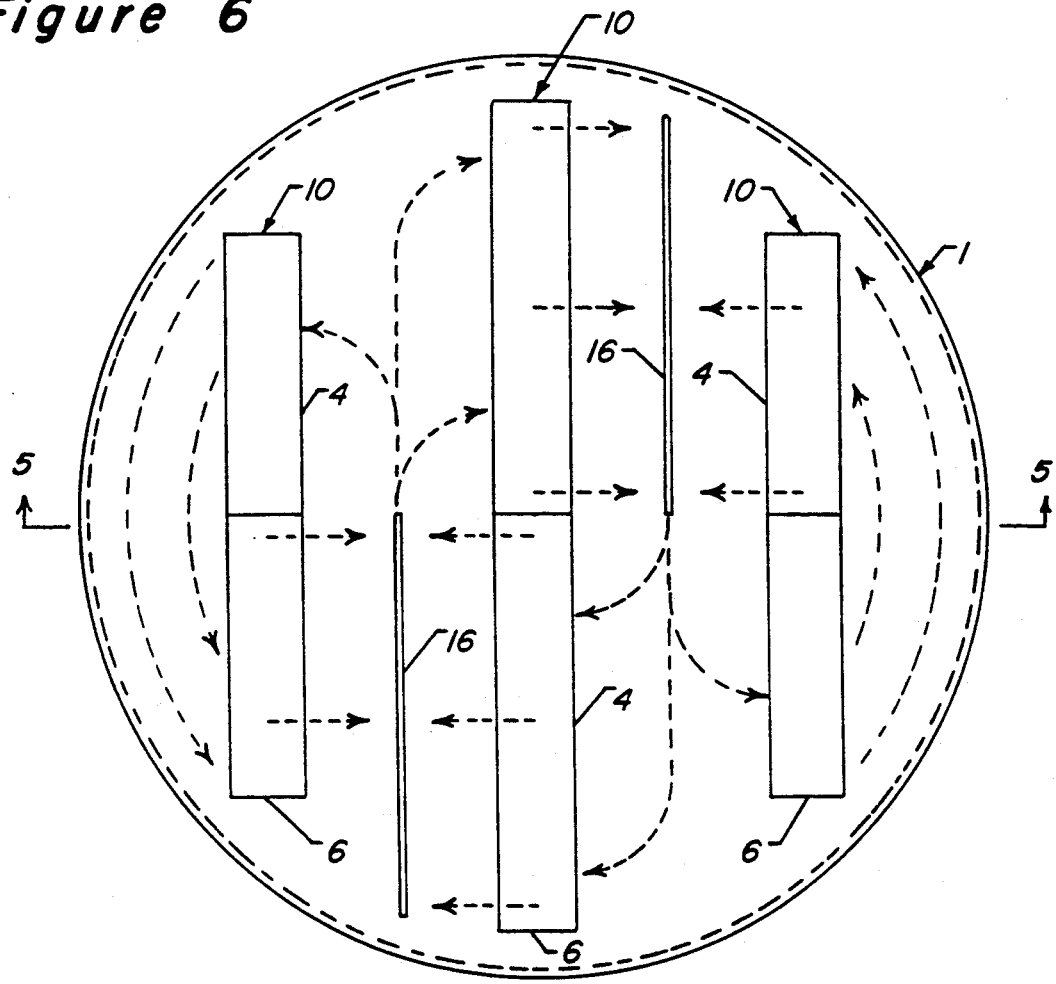
FIG. 6 is an overhead view of the tray of FIG. 5 showing the intended liquid flow paths on the surface of the tray.

FIG. 6 is an overhead view of the tray embodiment of FIG. 5. This figure is presented to illustrate the liquid/froth flow across the surface of this tray embodiment. This view shows how this tray arrangement is capable of providing a longer liquid residence and liquid flow path than a tray on which the liquid flows across the tray perpendicular to the downcomers. It is also very apparent that this embodiment of the invention does not incorporate a vertical central baffle (baffle 7 of FIG. 1) extending upward from the surface of the tray deck to prevent liquid admixture.

FIGS. 5 and 6 also illustrate the provision of an optional liquid flow directing baffle 13 on the upper surface of the tray deck midway between two downcomers. The baffles 13 are preferably provided on the portions of the tray deck which receive liquid from two downcomer baffles 3 and 3'. The baffles may be perforated since their primary function is to help divert liquid and froth flowing across the tray deck to the other end of the downcomer. The baffles 13 may extend the entire length of the downcomer 10 but preferably are only equal in length to one-half of an associated downcomer. Again, these baffles are optional.

One embodiment of the subject invention may accordingly be characterized as an apparatus for use as the vapor liquid contacting means present within the internal volume of a fractional distillation column comprising a plurality of similarly constructed fractionation trays in spaced relation and aligned above one another to define an inter tray volume located between each pair of adjacent trays, with each tray comprising at least two trough-shaped downcomer means which comprise two side walls and two end walls and extend into said inter tray volume on two sides of the tray, with the downcomer means of all of the trays being aligned in the same direction and located above one another; inclined liquid deflecting baffles extending through the intertray volumes from the outlet end of the downcomer means of each tray to the inlet end of the aligned downcomer of the tray immediately below, with the vapor deflecting baffles traversing the space above the inlet to the tray immediately below and sealing the inlet to liquid flowing downward from the outlet of the downcomer immediately above; and, means for separating the internal volume of the column into at least four symmetrical and segregated vapor flow paths extending from a lower end of the column to an upper end of the column, said means comprising a planar central baffle extending axially into the intertray volume between the first and second ends of the column.

A more inclusive embodiment of the invention is a fractionation column comprising an enclosed cylindrical outer vessel having a plurality of the subject trays, central baffle and downcomer baffles mounted therein. The overall apparatus would include the customary accessories for feeding the liquid and vapor streams to be contacted and such other normal employed equipment as a reboiler and a reflux system.

The subject trays were tested using a methanol water mixture. The tests were conducted using a 24-inch diameter column. The object of the tests were to determine the tray efficiencies at various loadings. The results are shown in Table 1 below. They indicate that the trays of the subject invention showed higher efficiencies than at either a conventional multiple downcomer tray or a proprietary improved version of the multiple downcomer tray shown in U.S. patent application Ser. No. 07/779,216 filed Oct. 18, 1991.

TABLE 1

| Steam Setting % | Conventional | Modified Conventional | Invention |
|---|---|---|---|
| 50 | 58 | 59 | 48 |
| 60 | 56 | 56 | 59 |
| 70 | 55 | 55 | 66 |
| 80 | 54 | 50 | 63 |
| 90 | 54 | 49 | 57 |

What is claimed is:

1. A vapor-liquid contacting tray having a generally circular circumference and comprising:
   (i) at least one centrally located, narrow, trough-shaped downcomer, each downcomer being formed by two opposing side walls and two end walls which are shorter than the side walls, the side walls and end walls being oriented perpendicular to the plane of the tray, each downcomer having an open inlet and a liquid sealable outlet means,
   (ii) at least two elongated vapor-liquid contacting decks, with a vapor-liquid contacting deck being located adjacent each downcomer side wall such that the tray has at least one more vapor-liquid contacting deck than downcomer means; and,
   (iii) means to define vertical liquid flow paths for liquid flowing onto the tray from a vertically superior downcomer comprising two inclined downcomer baffles, with the downcomer baffles intersecting an upper edge of the side walls, the downcomer baffles being substantially equal in length to one-half of the associated downcomer and crossing over the open inlets of each downcomer, with the two downcomer baffles of each downcomer being inclined to deliver liquid to different contacting decks.

2. The tray of claim 1 further characterized in that a vapor deflecting baffle extends outward substantially parallel to a contacting deck from the intersection of the downcomer baffle and the upper edge of the downcomer sidewall.

3. The tray of claim 2 wherein the vapor-deflecting baffle is substantially imperforate.

4. A trayed vapor-liquid contacting apparatus useful in the separation of volatile chemical compounds and comprising:
   a. a cylindrical outer vessel having an enclosed upper first end and an enclosed lower second end, and a cylindrical internal volume;
   b. a plurality of multiple downcomer-type vapor-liquid contacting trays spaced vertically apart within the outer vessel, each tray having a generally circular circumference and comprising:
      (i) at least one centrally located, narrow, trough-shaped downcomer, each downcomer being formed by two opposing side walls and two end walls which are shorter than the side walls, the side walls and end walls being oriented perpendicular to the plane of the tray, each downcomer having an open inlet and a liquid sealable outlet means, with the downcomer means of vertically adjacent trays being in vertical alignment above one another, (ii) at least two elongated vapor-liquid contacting decks, with a vapor-liquid contacting deck being located adjacent each downcomer side wall such that the tray has at least one more vapor-liquid contacting deck than downcomer means;

c. a centrally located planar liquid/vapor baffle located on each tray and bisecting the length of each downcomer into two halves along the central axis of the outer vessel and dividing each vapor-liquid contacting deck into two symmetrical areas each having a shape of a 90 degree sector; the liquid/vapor baffle extending from the deck surface to a point above; and, d.) means to define vertical liquid flow paths between adjacent trays comprising a plurality of inclined downcomer baffles, with each baffle extending from one sidewall of each downcomer to an opposite sidewall of an aligned downcomer of a vertically adjacent tray, the downcomer baffles crossing over the open inlets of the downcomers, with each of two downcomer baffles being placed over different sections of each downcomer and with the two downcomer baffles of each downcomer being inclined to deliver liquid to different contacting decks.

5. The column of claim 4 wherein a vapor deflecting baffle extends outward from the intersection of the downcomer baffle and the upper edge of the downcomer sidewall.

6. The column of claim 5 wherein the vapor-deflecting baffle is substantially parallel to the tray contacting deck.

7. The column of claim 5 wherein the vapor-deflecting baffle is substantially imperforate.

8. A trayed fractionation column useful in the separation of volatile chemical compounds and comprising:

a. a cylindrical outer vessel having an enclosed upper first end and an enclosed lower second end, and a cylindrical internal volume;

b. a plurality of multiple downcomer-type vapor-liquid contacting trays spaced vertically within the outer vessel, each tray having a generally circular circumference, and comprising:

(i) at least two narrow, trough-shaped downcomer which are parallel to each other and equidistantly spaced across the tray, each downcomer being formed by two opposing side walls and two end walls which are shorter than the side walls, the side walls and end walls oriented perpendicular to the plane of the tray, each downcomer having an open inlet and a liquid sealable outlet means, with the downcomer means of vertically adjacent trays being in vertical alignment above one another, (ii) a plurality of elongated vapor-liquid contacting decks, with a vapor-liquid contacting deck being located adjacent each downcomer side wall such that the tray has at least one more vapor-liquid contacting deck than downcomer means;

c. a centrally located planar liquid vapor baffle located on each tray extending and bisecting the length of each downcomer into two halves and also dividing each vapor-liquid contacting deck into two symmetrical areas each having a shape of a 90 degree sector; and, d. means to define liquid flow paths comprising a pair of inclined downcomer baffles located above the open inlet of each downcomer, with each baffle extending from the one sidewall of each downcomer to an opposite sidewall of an aligned downcomer of a vertically adjacent tray, with one of each pair of downcomer baffles being attached to each of the two downcomer sidewalls.

9. The column of claim 8 wherein there are at least three downcomers and the downcomer baffles are uniformly aligned on each downcomer.

10. The column of claim 8 wherein there are at least three downcomers and the downcomer baffles of at least one pair of horizontally adjacent downcomers are aligned in an opposite direction such that the liquid flow path for this pair of downcomers directs liquid to a single intermediate vapor-liquid contacting deck.

11. The column of claim 8 wherein a vapor deflecting baffle extends outward from the intersection of the downcomer baffle and the upper edge of the downcomer sidewall.

12. Apparatus for use as the vapor-liquid contacting means present within the internal volume of a fractional distillation column comprising:

a. a plurality of similarly constructed fractionation trays in spaced relation and aligned above one another to define intertray volumes located between each pair of adjacent trays, with each tray comprising at least two trough-shaped downcomer means, which comprise two side walls and two end walls and extend into said intertray volume on two sides of the tray, with the downcomer means of the trays being aligned in the same direction and located above one another;

b. inclined liquid deflecting means comprising a pair of baffles extending, through the inter tray volumes from an outlet end of the downcomer means of each tray to an inlet end of the aligned downcomer of the tray immediately below, with the vapor deflecting baffles traversing the space above the inlet to the tray immediately below and sealing the inlet to liquid flowing downward from the outlet of the downcomer immediately above, and with each baffle of a pair of baffles having an opposite vertical slope over a different half of the length of the downcomer; and, c. means for separating the intertray volume into at least four symmetrical vapor flow paths and for limiting liquid admixture, said means comprising planar central baffles extending axially into the intertray volume at a midpoint of each downcomer means.

* * * * *